United States Patent
Tabata et al.

(12)

(10) Patent No.: US 12,014,585 B2
(45) Date of Patent: Jun. 18, 2024

(54) UNUSUAL-NOISE DETERMINATION DEVICE FOR VEHICLE

(71) Applicant: TOYOTA JIDOSHA KABUSHIKI KAISHA, Toyota (JP)

(72) Inventors: Atsushi Tabata, Okazaki (JP); Ken Imamura, Toyota (JP); Koichi Okuda, Toyota (JP); Masato Nakano, Toyota (JP); Toshiaki Tamachi, Seto (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 391 days.

(21) Appl. No.: 17/490,811

(22) Filed: Sep. 30, 2021

(65) Prior Publication Data

US 2022/0108570 A1    Apr. 7, 2022

(30) Foreign Application Priority Data

Oct. 6, 2020  (JP) ................................ 2020-168837

(51) Int. Cl.
  *G07C 5/08* (2006.01)
  *G01M 13/028* (2019.01)
(52) U.S. Cl.
  CPC ......... *G07C 5/0808* (2013.01); *G01M 13/028* (2013.01); *G07C 5/085* (2013.01)
(58) Field of Classification Search
  CPC ... G07C 5/0808; G07C 5/085; G01M 13/028; G01M 7/00; G01M 17/007; G01H 3/00
  See application file for complete search history.

(56) References Cited

U.S. PATENT DOCUMENTS 11,361,782 B2 * 6/2022 Ninomiya ............... G10L 25/18

FOREIGN PATENT DOCUMENTS

JP  2014-222189 A  11/2014

OTHER PUBLICATIONS

Fang, Yuan, and Tong Zhang. "Sound quality investigation and improvement of an electric powertrain for electric vehicles." IEEE Transactions on Industrial Electronics 65.2 (2017): 1149-1157. (Year: 2017).*

* cited by examiner

*Primary Examiner* — Russell Frejd
*Assistant Examiner* — Ana D Thomas
(74) *Attorney, Agent, or Firm* — Oliff PLC (57) ABSTRACT

An unusual-noise determination device for a vehicle that performs unusual-noise determination to determine whether a power transmission system of the vehicle is generating unusual noise. The unusual-noise determination device includes an execution device and a memory device. The memory device stores a neural network that uses the maximum sound pressure and the excess ratio as inputs, and outputs a determination result variable, which is a variable indicating a result of the unusual-noise determination. The neural network is a trained neural network that has been trained using various values related to each of multiple vehicles as training data. The execution device is configured to perform the unusual-noise determination based on an output of the trained neural network that uses, as inputs, the maximum sound pressure and the excess ratio.

5 Claims, 5 Drawing Sheets

UNUSUAL-NOISE DETERMINATION DEVICE FOR VEHICLE

BACKGROUND

1. Field

The present disclosure relates to an unusual-noise determination device for a vehicle that performs unusual-noise determination to determine whether a power transmission system of the vehicle is generating unusual noise.

2. Description of Related Art

Japanese Laid-Open Patent Publication No. 2014-222189 discloses an unusual-noise determination device for a vehicle that determines whether unusual noise that is unpleasant to occupants is being generated in a passenger compartment. The unusual-noise determination device of the publication determines whether there is unusual noise based on the difference in sound pressure between a background noise of a vehicle and sound in the passenger compartment.

The unusual-noise determination device of the above-described publication determines whether there is unusual noise based on sound pressure. However, whether unusual noise is perceived as unpleasant cannot be evaluated properly using the level of sound pressure alone.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an unusual-noise determination device for a vehicle is provided. The unusual-noise determination device performs unusual-noise determination to determine whether a power transmission system of the vehicle is generating unusual noise. The unusual-noise determination device includes an execution device and a memory device. A maximum sound pressure is defined as a maximum value of sound pressures obtained by measuring a sound pressure of an operating noise of the power transmission system at multiple frequencies, while changing an input rotation speed of the power transmission system. An excess ratio is defined as a ratio of frequency ranges in which the sound pressure exceeds a reference value to an overall range of frequencies in which the sound pressure is measured. The memory device stores a neural network that uses the maximum sound pressure and the excess ratio as inputs, and outputs a determination result variable. The determination result variable is a variable indicating a result of the unusual-noise determination. The neural network is a trained neural network that has been trained using training data. The training data includes measured values of the maximum sound pressure and the excess ratio of each of multiple vehicles, and an evaluation value of the determination result variable that is set through sensory evaluation by evaluators for each of the multiple vehicles. The execution device is configured to perform the unusual-noise determination based on an output of the trained neural network that uses, as inputs, the maximum sound pressure and the excess ratio.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An unusual-noise determination device 10 for a vehicle according to one embodiment will now be described with reference to FIGS. 1 to 4.

Figure 1:
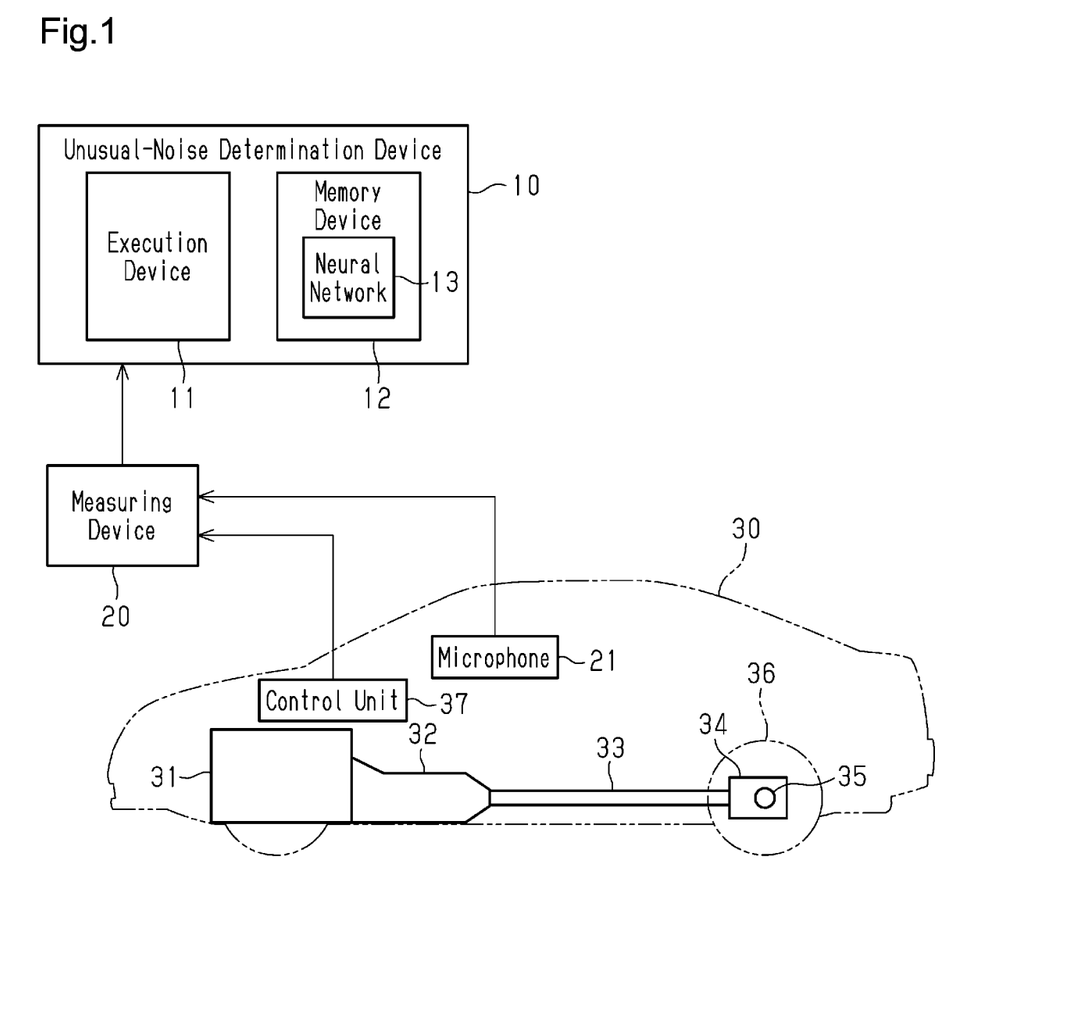
FIG. 1 is a diagram schematically showing the configuration of an unusual-noise determination device for a vehicle according to one embodiment.

As shown in FIG. 1, a vehicle 30 includes a drive source 31, which includes an engine and/or a motor. The driving force generated by the drive source 31 is transmitted to wheels 36 via an automatic transmission 32, a propeller shaft 33, a differential mechanism 34, and an axle 35. The unusual-noise determination device 10 according to the present embodiment is configured to perform unusual-noise determination to determine whether unusual noise is being generated by the power transmission system of the vehicle 30, which transmits driving force from the drive source 31 to the wheels 36.

<Structure of Unusual-Noise Determination Device>

The configuration of the unusual-noise determination device 10 according to the present embodiment will now be described. The unusual-noise determination device 10 is an electronic calculator that includes an execution device 11 and a memory device 12. The memory device 12 stores a neural network 13 used in the determination. The execution device 11 performs the unusual-noise determination and executes calculation process for training the neural network 13. The unusual-noise determination device 10 may be processing circuitry including: 1) one or more processors that operate according to a computer program (software); 2) one or more dedicated hardware circuits (application specific integrated circuits: ASIC) that execute at least part of various processes, or 3) a combination thereof. The processor includes a central processing unit (CPU) and memories such as a random-access memory (RAM) and a read-only memory (ROM). The memories store program codes or commands configured to cause the CPU to execute processes. The memory, which is a computer-readable medium, includes any type of media that are accessible by general-purpose computers and dedicated computers.

The unusual-noise determination device 10 is connected to a measuring device 20, which measures data used in the unusual-noise determination and the training of the neural network 13. The measuring device 20 is connected to a microphone 21 for measuring unusual noise. For the purpose of measurement of unusual noise, the measuring device 20 is also connected to a control unit 37 of the vehicle 30. The measuring device 20 obtains, from the control unit 37, information indicating the state of the vehicle 30 such as a vehicle speed and an accelerator operation amount. The accelerator operation amount is an operated amount of an accelerating device, for example, the depressed amount of the accelerator pedal by the driver.

<Measurement of Unusual Noise>

Next, measurement of unusual noise performed by the measuring device 20 will be described. Measurement of unusual noise is performed with the vehicle 30 placed on a chassis dynamometer. The microphone 21 is placed at a predetermined measurement position for measuring unusual noise. In the present embodiment, unusual noise perceived by an occupant of the vehicle 30 is subject to determination, and the microphone 21 is thus placed inside the passenger compartment. If unusual noise that leaks out from the vehicle 30 is subject to determination, the microphone 21 is preferably arranged outside the vehicle 30.

When measuring unusual noise, the measuring device 20 records the output of the microphone 21 during a period in which an input rotation speed of the power transmission system, that is, the rotation speed delivered from the drive source 31 to the automatic transmission 32, changes by a specified amount, while the vehicle 30 is performing simulated traveling on the chassis dynamometer. Also, the measuring device 20 obtains the vehicle speed and the accelerator operation amount from the control unit 37 of the vehicle 30 during measurement of unusual noise, and records the vehicle speed and the accelerator operation amount. In some cases, the values of the vehicle speed and the accelerator operation amount change while the input rotation speed of the power transmission system is changing. In such cases, for each of the vehicle speed and the accelerator operation amount, the value at the beginning of the change in the input rotation speed, the value at the end of the change, or the average value during the change in the input rotation speed may preferably be recorded as a value during measurement of unusual noise.

By means of a spectral analysis, the measuring device 20 obtains the sound pressure at each frequency of the sound measured by the microphone 21 during the measurement period. That is, the measuring device 20 obtains the frequency spectrum of the measured sound. The measurement range of frequencies, in which the sound pressure is measured for each frequency, is set to a range of frequencies of sound that is potentially perceived as unusual noise. For example, the measurement range is set to the hearing range.

The measuring device 20 obtains two values from the frequency spectrum, which are a maximum sound pressure and an excess ratio. The maximum sound pressure is the maximum value among values of sound pressure obtained by measuring sound pressure at multiple frequencies. The excess ratio is the ratio of frequency ranges in which the sound pressure exceeds a reference value to the overall range of frequencies in which the sound pressure is measured.

In the present embodiment, prior to calculation of the maximum sound pressure and the excess ratio, the measuring device 20 performs sensory characteristic correction on the measured value of sound pressure at each frequency in order to compensate for differences in the auditory sensitivity to respective frequencies. The measuring device 20 uses the values of the sound pressure subjected to the sensory characteristic correction when obtaining the maximum sound pressure and the excess ratio. The sensory characteristic correction is performed using a sensory characteristic correction factor, the value of which is set in correspondence with each frequency. The measuring device 20 multiplies the measured value of the sound pressure at each frequency by the sensory characteristic correction factor that corresponds to that frequency, there by obtaining the corrected value of the sound pressure.

Figure 2:
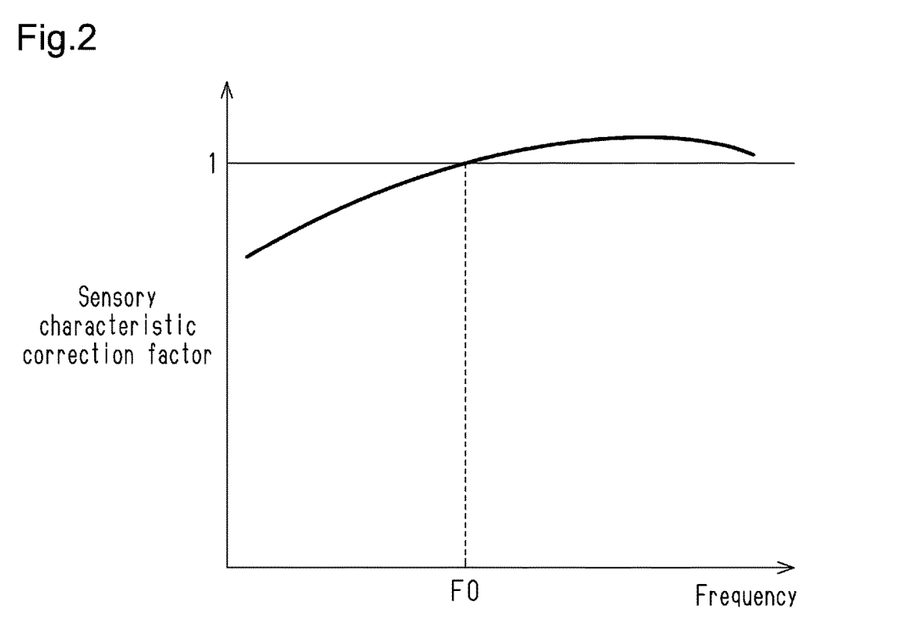
FIG. 2 is a graph showing a relationship between a sensory characteristic correction factor and frequency.

FIG. 2 shows a relationship between the sensory characteristic correction factor and frequency. Some frequencies are easily perceived by humans, while some other frequencies are not easily perceived by humans. Thus, even if the sound pressure is the same, sounds of different frequencies may be perceived as having different levels of loudness. The values of the sensory characteristic correction factor corresponding to the respective frequencies are set based on the following research findings related to the frequency characteristics of the auditory sensitivity of humans. In this research, a reference sound was set to a sound of a specified sound pressure at a specific frequency F0. Sensory evaluation of loudness of sound, which will be discussed below, was performed by multiple evaluators. An evaluator was first exposed to the reference sound and then to sounds of frequencies different from that of the reference sound with the sound pressure being varied. The sound pressure at each of the different frequencies was obtained when the evaluator sensed that the loudness was the same as that of the reference sound. The sound pressure at which the evaluator sensed that the loudness was the same as that of the reference sound is defined as sensory equivalent sound pressure. In the above-described sensory evaluation, the average of the sensory equivalent sound pressures obtained from the multiple evaluators is obtained for each frequency. The value of the sensory characteristic correction factor that corresponds to each frequency is set to a quotient obtained by dividing the sound pressure of the reference sound by the sensory equivalent sound pressure for that frequency.

Figure 3:
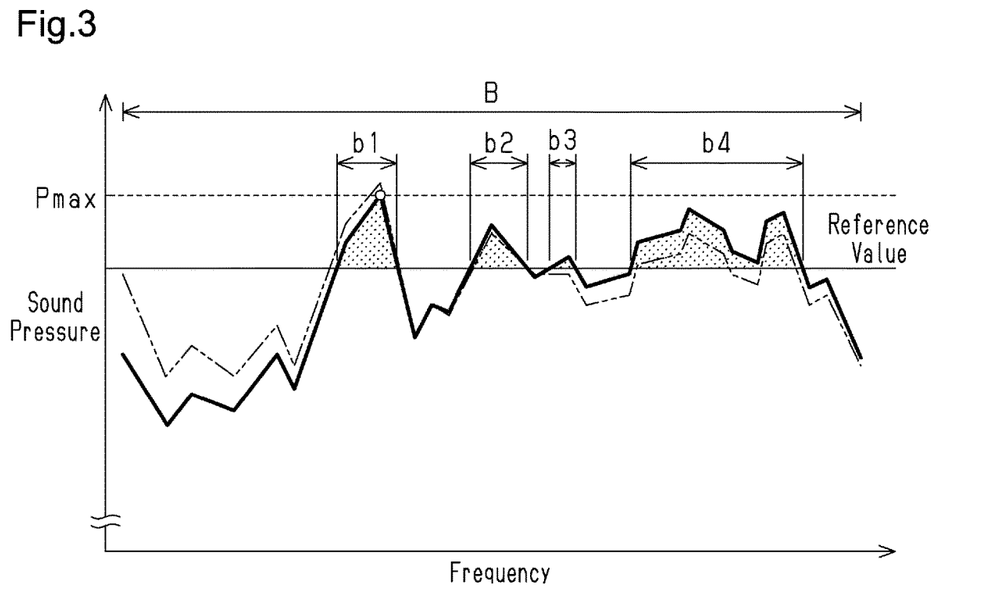
FIG. 3 is a diagram showing a manner in which a maximum sound pressure and an excess ratio are calculated.

FIG. 3 shows the results of unusual-noise measurement, that is, one example of measurement result of the sound pressure at each frequency. The broken line represents values prior to the sensory characteristic correction, and the solid line represents the values after the sensory characteristic correction. The symbol B in FIG. 3 represents the width of the frequency band of the whole range in which the sound pressure is measured at each frequency. The symbols b1, b2, b3, and b4 in FIG. 3 each represent the width of a frequency band in which the sound pressure at the frequency after the sensory characteristic correction exceeds the reference value. In the case of FIG. 3, the values of the sound pressure after the sensory characteristic correction include a maximum value Pmax as the maximum sound pressure. The sum of the widths b1, b2, b3, and b4 is divided by the width B, and the quotient is obtained as the value of the excess ratio.

<Structure of Neural Network>

Next, the structure of the neural network 13 will be described with reference to FIG. 4. The neural network 13 includes an input layer having four nodes, an intermediate layer having n nodes, and an output layer having two nodes. In the following description, the symbol i represents arbitrary integer that is greater than or equal to 1 and less than or equal to 4. Also, in the following description, the symbol j represents arbitrary integer that is greater than or equal to 1 and less than or equal to n.

Figure 4:
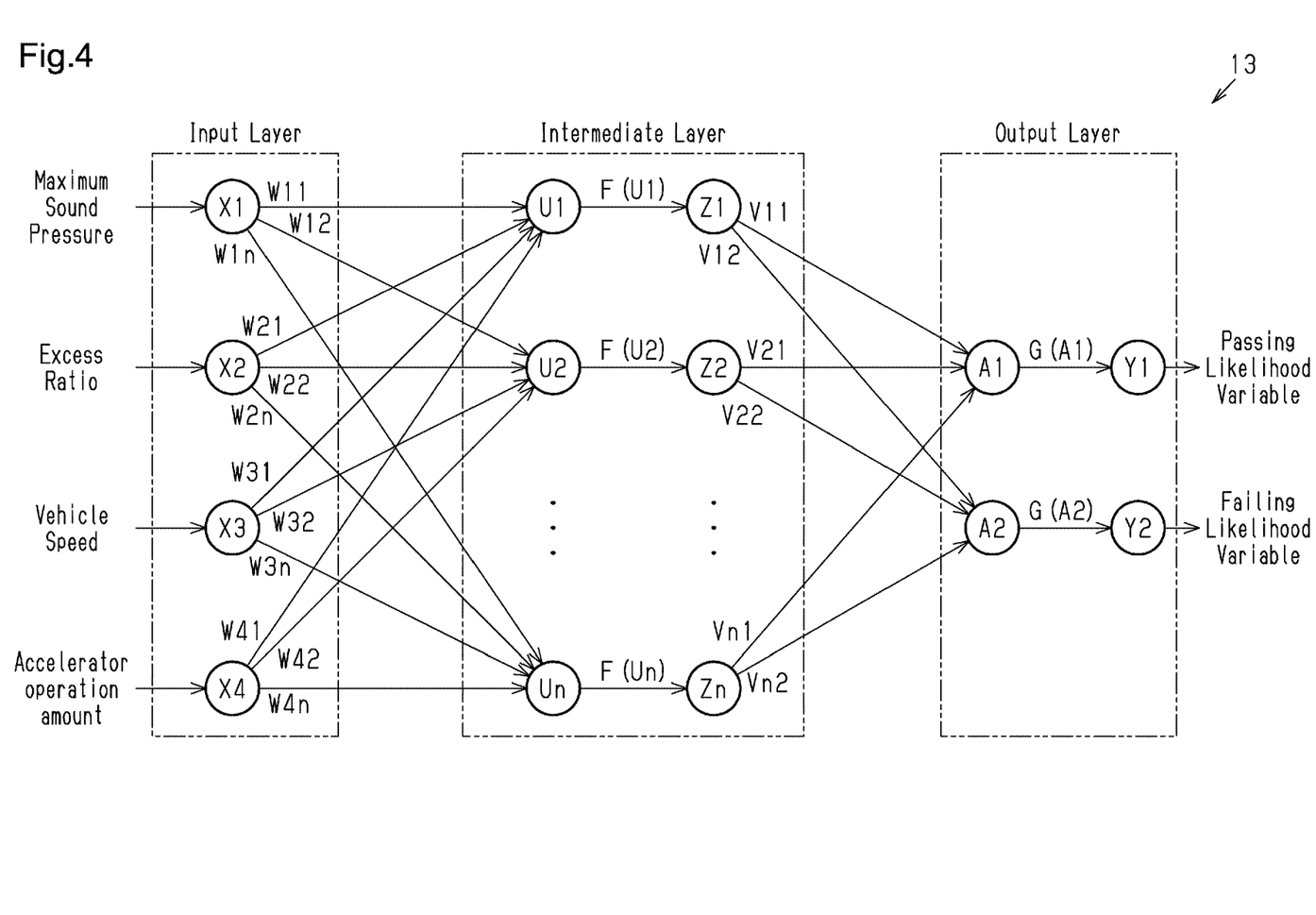
FIG. 4 is a diagram schematically showing the structure of a neural network of the unusual-noise determination device shown in FIG. 1.

In FIG. 4, the input values fed to the four nodes of the input layer are represented by X1, X2, X3, and X4, respectively. The input value X1 is a maximum sound pressure, and the input value X2 is an excess ratio. Also, the input value X3 is a vehicle speed, and the input value X4 is an accelerator operation amount.

In FIG. 4, the input values fed to the n nodes of the intermediate layer are represented by U1, U2, . . . , Un, respectively, and the output values from the n nodes of intermediate layer are represented by Z1, Z2, . . . , Zn, respectively. The input value Uj fed to each node of the intermediate layer is calculated as the sum of the values obtained by multiplying the respective input values X1, X2, X3, and X4 of the input layer by a weight Wij. The output value Zj from each node of the intermediate layer is calculated as a return value of an activation function F, which uses the input value Uj as an argument. In the present embodiment, a sigmoid function is used as the activation function F.

An input value A1 of one of the two nodes of the output layer is calculated as the sum of the values obtained by multiplying the respective output values Zj of the n nodes of the intermediate layer by a weight Vj1. An input value A2 of the other node of the output layer is calculated as the sum of the values obtained by multiplying the respective output values Zj of the n nodes of the intermediate layer by a weight Vj2. Output values Y1 and Y2 of the two nodes of the output layer are calculated as return values of a softmax function G, which uses the input values A1 and A2 of the respective nodes as arguments. Accordingly, the output values Y1 and Y2 of the nodes of the output layer are calculated such that the output values Y1 and Y2 each have a value greater than or equal to 0 and less than or equal to 1, and that the sum of the output values Y1 and Y2 is 1. In the neural network 13, the output value Y1 is a passing likelihood variable, which indicates the likelihood that the result of the unusual-noise determination indicates no unusual noise being generated. In contrast, the output value Y2 is a failing likelihood variable, which indicates the likelihood that the result of the unusual-noise determination indicates existence of unusual noise. In the present embodiment, the passing likelihood variable and the failing likelihood variable correspond to the determination result variable, which indicates the result of the unusual-noise determination.

The neural network 13, which is configured as described above, uses the maximum sound pressure, the excess ratio, vehicle speed, and the accelerator operation amount as inputs, and outputs the likelihood of determination that there is unusual noise.

<Training of Neural Network>

Next, a method for generating the neural network 13, that is, a method for training of the neural network 13 will be described.

When the neural network 13 is trained, unusual noise is measured in the above-described manner in various traveling states of multiple vehicles 30 of the same model. A determination as to whether there is unusual noise is also performed together with measurement of unusual noise. The determination as to whether there is unusual noise is performed through sensory evaluation by multiple evaluators. In the sensory evaluation, each evaluator listens to sound recorded using the microphone 21 during the measurement of unusual noise, and evaluates the perception of the sound. Each evaluator performs the evaluation by giving marks to the recorded sound with regard to the regularity, the muffledness, the reverberation, the loudness, the pitch, and the roundness of the sound. Whether the sound is unpleasant unusual noise is determined based on the results of sensory evaluations of the respective evaluators.

A great number of data sets, each including the values of the maximum sound pressure, the excess ratio, the vehicle speed, the accelerator operation amount, and the determination result variable, are created each time unusual noise is measured. The neural network 13 is trained using training data including a great number of such data sets. The values of the passing likelihood variable and the failing likelihood variable in each data set are set in the following manner. That is, when it is determined that there is no unusual noise through the sensory evaluation, the passing likelihood variable is set to 1, and the failing likelihood variable is set to 0. Also, when it is determined that there is unusual noise through the sensory evaluation, the passing likelihood variable is set to 0, and the failing likelihood variable is set to 1.

In the training of the neural network 13, the following process is executed for each data set. First, the values of the maximum sound pressure, the excess ratio, the vehicle speed, and the accelerator operation amount in each data set are fed to the neural networks 13 as the values of the input values X1 to X4 of the input layer. Then, the weights Wij, Vj1, and Vj2 are corrected using the error back propagation algorithm in order to reduce errors of the output values Y1 and Y2 of the output layer, which correspond to the inputs, and the passing likelihood variable and the failing likelihood variable of the data. Such correction of the weights Wij, Vj1, and Vj2 is repeated until the errors are less than or equal to predetermined values. When the errors are less than or equal to the predetermined values, the training of the neural network 13 is determined to be completed.

In the present embodiment, the training process of the neural network 13 is executed by the execution device 11 of the unusual-noise determination device 10. When the neural network 13 is trained, the unusual-noise determination device 10 stores training data created from the results of the above-described unusual-noise measurement in the memory device 12. The training of the neural network 13 may be performed by a device other than the unusual-noise determination device 10, and the trained neural network 13 may be stored in the memory device 12.

<Unusual-Noise Determination>

Next, the unusual-noise determination performed by the unusual-noise determination device 10 according to the present embodiment will now be described. The unusual-noise determination device 10 according to the present embodiment is used for the following purposes. That is, when the user suspects that there is unusual noise and brings the vehicle 30 to the dealer or the like, the unusual-noise determination device 10 is used to determine whether there is actually unusual noise due to an anomaly in the power transmission system with objective criteria.

At the unusual-noise determination, the above-described unusual-noise measurement is performed in the vehicle 30, which is subject to the unusual-noise determination. The measuring device 20 delivers, to the unusual-noise determination device 10, the maximum sound pressure and the excess ratio, which are obtained from the measurement results, and the vehicle speed and the accelerator operation amount at the time of the unusual-noise measurement, which are obtained from the control unit 37 of the vehicle 30. The execution device 11 of the unusual-noise determination device 10 feeds, to the input layer of the neural network 13, the values of the maximum sound pressure, the excess ratio, the vehicle speed, and the accelerator operation amount from the measuring device 20 as the input values X1 to X4. In response to the input, the execution device 11 calculates the output values Y1, Y2 of the output layer of the neural network 13.

As described above, the output value Y1 is a passing likelihood variable, which indicates the likelihood that the result of the unusual-noise determination indicates no unusual noise being generated. In contrast, the output value Y2 is a failing likelihood variable, which indicates the likelihood that the result of the unusual-noise determination indicates existence of unusual noise. Thus, if a value close to 1 is calculated as the output value Y1, and a value close to 0 is calculated as the output value Y2, there is unlikely to be unusual noise. In contrast, if a value close to 0 is calculated as the output value Y1, and a value close to 1 is calculated as the output value Y2, there is likely to be unusual noise. In the present embodiment, a determination threshold is set in advance to a value greater than 0.5 and less than 1. The execution device 11 determines there is no unusual noise when the output value Y1 is greater than or equal to the determination threshold, and determines that there is unusual noise when the output value Y2 is greater than or equal to the determination threshold. Also, the execution device 11 suspends the determination when the output values Y1 and Y2 are both less than the determination threshold.

In some cases, unusual noise is generated only in specific traveling states. When a traveling state in which generation of unusual noise is suspected is identified, measurement and determination of unusual noise may be performed in that traveling state. In contrast, when a traveling state in which generation of unusual noise is suspected is not identified, measurement and determination of unusual noise may be performed in multiple traveling states.

The unusual-noise determination can be performed when the unusual-noise determination device 10 and the measuring device 20 are both installed in the same facility, for example, the dealer's facility. The unusual-noise determination can also be performed even if the unusual-noise determination device 10 is installed in a location different from the measuring device 20. For example, only the measuring device 20 may be installed in the dealer's facility, and the unusual-noise determination device 10 may be installed in the data center. In such a case, the unusual-noise determination device 10 and the measuring device 20 are connected to each other by a wide area communication link such as the Internet. The unusual-noise determination is performed through transmission and reception of measurement results and determination results between the unusual-noise determination device 10 and the measuring device 20 through the wide area communication link.

Operations and Advantages of Embodiment

The loudness and the quality of operating noise generated by the power transmission system of the vehicle 30 vary depending on the traveling state of the vehicle 30. Also, the operating noise of the power transmission system contains frequency components that are proportionate to the rotation speeds of components of the power transmission system such as gears. The frequencies of such frequency components change together with changes in the rotation speeds of the power transmission system. In the present embodiment, the measuring device 20 measures the sound pressure at each frequency of the operating noise of the power transmission system while the control unit 37 of the vehicle 30 changes the input rotation speed. The measuring device 20 obtains, as a value of a maximum sound pressure, the maximum value of multiple sound pressures obtained by measuring sound pressures at multiple frequencies. Also, the measuring device 20 obtains, as a value of the excess ratio, the ratio of frequencies of which the sound pressures exceed a reference value to all the frequencies of which the sound pressures are measured.

If a markedly loud operating noise is generated even momentarily during the process of change in the input rotation speed of the power transmission system, that noise is perceived as an unpleasant unusual noise. In such a case, the maximum sound pressure has a large value. On the other hand, some operating noises are not perceived as unusual noises when generated momentarily. However, if such an operating noise is generated frequently or continuously during the process of change in the input rotation speed, that operating noise may be perceived as an unpleasant unusual noise. As described above, when the input rotation speed changes, the frequencies of the operating noise change, accordingly. Thus, during the process of change in the input rotation speed, if an operating noise of a certain sound pressure or higher is generated frequently or continuously, the sound pressure greater than or equal to a certain level is observed at multiple frequencies, increasing the excess ratio.

In this manner, the maximum sound pressure and the excess ratio function as index values for the unusual-noise determination from different perspectives. Thus, the unusual-noise determination based on both the maximum sound pressure and the excess ratio allows the generation of unusual noise to be accurately determined. However, whether unusual noise is unpleasant or not is a matter of sensitivity and sensory capacity of humans, and it is not easy to determine the degrees of contribution of the maximum sound pressure and the excess ratio to the perception of such unusual noise.

In this regard, the unusual-noise determination device 10 according to the present embodiment stores the neural network 13 in the memory device 12. The neural network 13 uses the maximum sound pressure and the excess ratio as inputs, and outputs the passing likelihood variable and the failing likelihood variable, which are determination result variables indicating results of the unusual-noise determination. The neural network 13 is trained using various values related to each of multiple vehicles 30 as training data. The various values include measured values of the maximum sound pressure and the excess ratio, and evaluation values of the determination result variables that are set through the sensory evaluation by evaluators. Therefore, even if the degrees of contribution of the maximum sound pressure and the excess ratio to the perception of unusual noise are not identified beforehand, it is possible to perform the unusual-noise determination based on the maximum sound pressure and the excess ratio.

The present embodiment has the following advantages.

(1) The unusual-noise determination device 10 determines whether the operating noise of the power transmission system contains unusual noise using the maximum sound pressure, which is an index value of the magnitude of the sound pressure of the operating noise, and the excess ratio, which is an index value of continuity and frequency of generation of the operating noise. This allows the unusual-noise determination to be performed while reflecting the sensitivity of humans, who perceive, as unpleasant, not only sound that is simply loud, but sound that is generated continuously or repeatedly and frequently.

(2) The unusual-noise determination device 10 determines whether there is unusual noise using the neural network 13. The neural network 13 uses the maximum sound pressure and the excess ratio as inputs, and outputs the passing likelihood variable and the failing likelihood variable, which indicate the results of the unusual-noise determination. Also, the neural network 13 is trained using, as training data, the above-described input values and output values of the respective vehicles 30. Therefore, even if the degrees of contribution of the maximum sound pressure and the excess ratio to the perception of unusual noise are unknown, it is possible to properly perform the unusual-noise determination based on the maximum sound pressure and the excess ratio.

(3) The frequency and the sound pressure of the operating noise of the power transmission system vary depending on the traveling state of the vehicle. Also, depending on the traveling state of the vehicle 30, the loudness of the background noise also changes. The background noise is generated in parts of the vehicle 30 other than the power transmission system. When the background noise is loud, the operating noise of the power transmission system is unlikely to be perceived as unusual noise. In the present embodiment, the vehicle speed and the accelerator operation amount are used as state variables that indicate the traveling state of the vehicle 30, and these state variables are delivered to the neural network 13 as inputs. Thus, the training of the neural network 13 and the unusual-noise determination are performed by reflecting changes in the operating noise and the background noise caused by the traveling state of the vehicle 30.

(4) In the present embodiment, the measuring device 20 performs the sensory characteristic correction in order to compensate for differences in the auditory sensitivity to respective frequencies of humans. The measuring device 20 multiplies the measured value of the sound pressure at each frequency by the sensory characteristic correction factor, the value of which is set in correspondence with each frequency. The measuring device 20 uses the values of the sound pressure after the correction, thereby obtaining the maximum sound pressure and the excess ratio. Accordingly, the training of the neural network 13 and the unusual-noise determination are performed by reflecting the frequency characteristics of the auditory sensitivity of the human, with which there are some frequencies that are easily perceived by the human ear, and some other frequencies that are not easily perceived by the human ear.

The above-described embodiment may be modified as follows. The above-described embodiment and the following modifications can be combined as long as the combined modifications remain technically consistent with each other.

Figure 5:
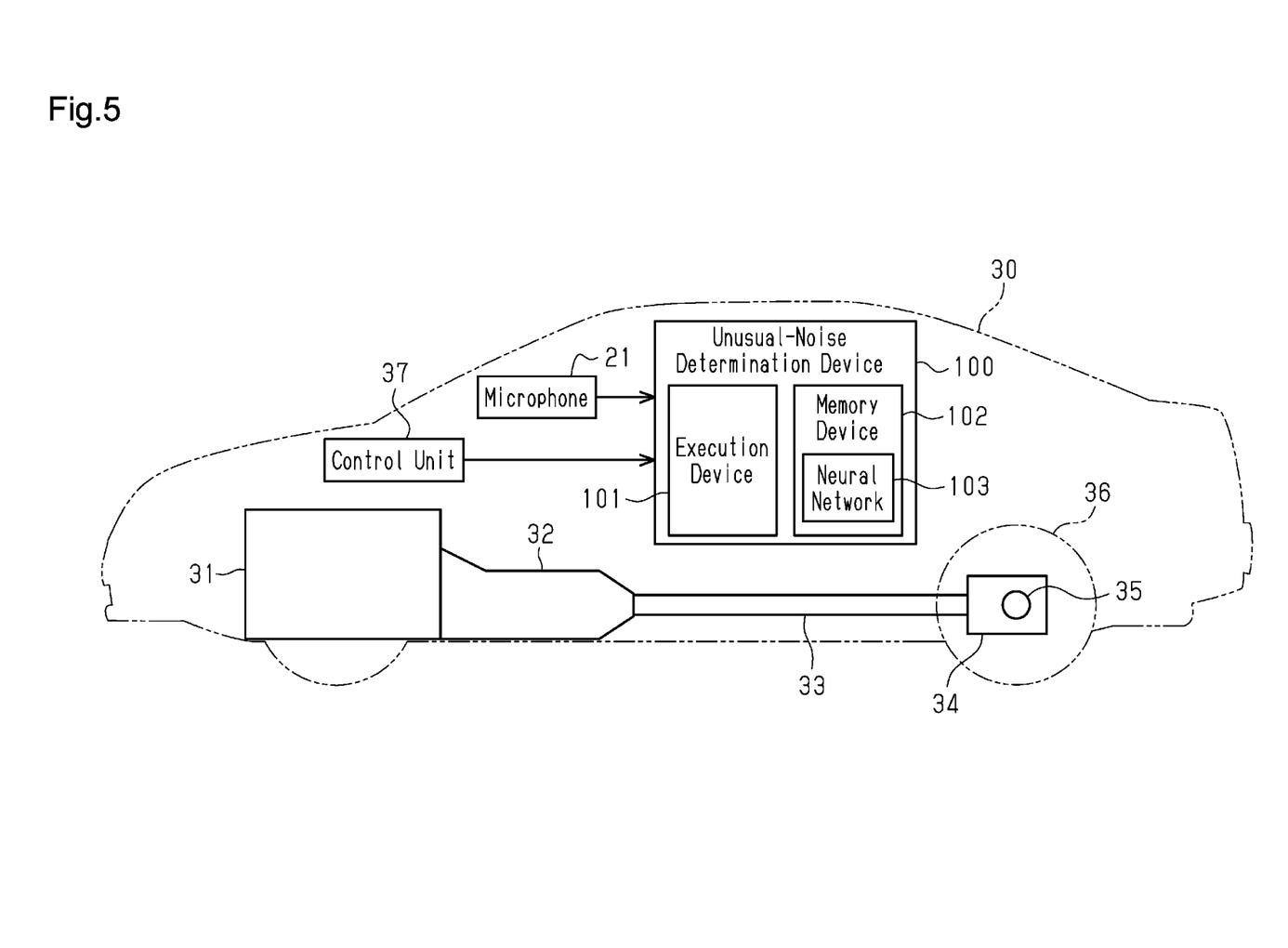
FIG. 5 is a diagram showing an unusual-noise determination device according to a modification, which is configured to perform unusual-noise determination while a vehicle is traveling.

The unusual-noise determination device may be mounted on a vehicle. FIG. 5 shows one example of an unusual-noise determination device mounted on the vehicle 30. The unusual-noise determination device 100 shown in FIG. 5 includes an execution device 101 and a memory device 102. The memory device 102 stores a neural network 103, which has been trained by an external device. The configuration of the neural network 103 is the same as that in the above-described embodiment. The unusual-noise determination device 100 is connected to the microphone 21 mounted on the vehicle 30 and the control unit 37 of the vehicle 30. The unusual-noise determination device 100 shown in FIG. 5 functions as the measuring device 20 in the above-described embodiment. That is, the unusual-noise determination device 100 obtains the maximum sound pressure and the excess ratio from detection results of the microphone 21. The execution device 101 calculates the output of the neural network 103, which uses, as inputs, the measured value of the maximum sound pressure, the measured value of the excess ratio, the vehicle speed, and the accelerator operation amount. The vehicle speed and the accelerator operation amount are obtained form the control unit 37 during the unusual-noise measurement. The execution device 101 determines whether there is unusual noise based on the output of the neural network 103, which has performed calculation.

Figure 6:
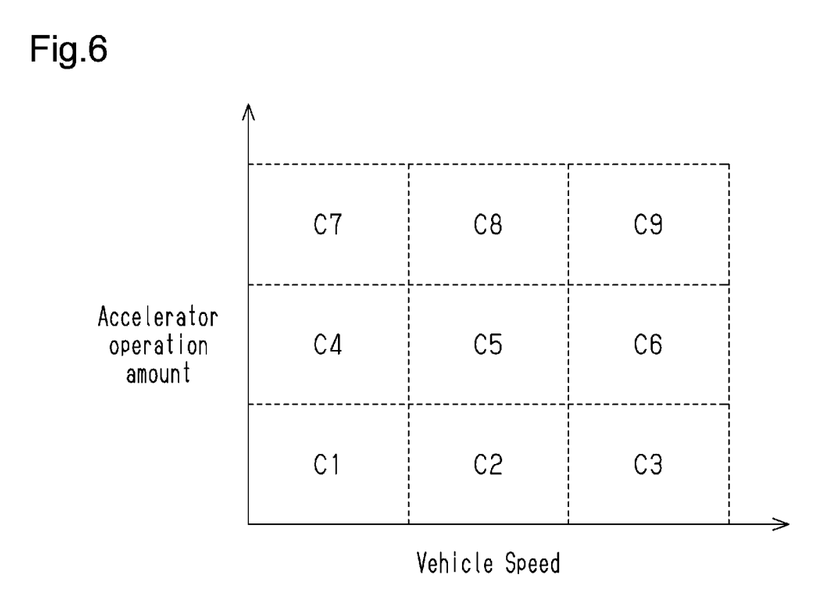
FIG. 6 is a graph showing one example of a manner in which training zones are set.

The site of unusual noise in the power transmission system may vary depending on the traveling state of the vehicle 30. Also, even for unusual noise generated in the same site, its sound pressure and quality may vary depending on the traveling state of the vehicle 30. Further, when the background noise changes because of the traveling state of the vehicle 30, the distinctness of the operating noise of the power transmission system may change. When the generation status of unusual noise and the environmental condition vary significantly depending on the traveling state of the vehicle 30, the neural network 13 cannot be trained properly, and the accuracy of the unusual-noise determination may deteriorate. In such a case, multiple training zones divided according to the traveling state of the vehicle 30 are set as shown in FIG. 6, for example. In the case shown in FIG. 6, nine training zones C1 to C9 are set, which are divided according to the vehicle speed and the accelerator operation amount. Separate neural networks 13 are set for the respective training zones, and the neural networks 13 are separately trained in the respective training zones. In each training zone, the corresponding neural network 13 is trained in accordance with the generation status of unusual noise and the environmental condition in that training zone. This allows the unusual-noise determination to be properly performed even if the generation status of unusual noise and the environmental condition vary significantly depending on the traveling state of the vehicle 30.

In the above-described embodiment, the maximum sound pressure and the excess ratio are obtained using values obtained by subjecting the measured value of the sound pressure at each frequency to the sensory characteristic correction. However, the present disclosure is not limited to this. For example, the maximum sound pressure and the excess ratio may be obtained using the measured value of the sound pressure at each frequency without performing the sensory characteristic correction.

In the above-described embodiment, the inputs to the neural network 13 include state variables that represent the traveling state of the vehicle 30, specifically the vehicle speed and the accelerator operation amount. The inputs to the neural networks 13 may include parameters that represent the traveling state of the vehicle 30, other than the vehicle speed and the accelerator operation amount, for example, the output torque of the drive source 31 and the selected gear of the automatic transmission 32. One or both of the vehicle speed and the accelerator operation amount may be omitted from the inputs to the neural network 13.

In a case in which the measurement of unusual noise is performed in a predetermined specific traveling state, the input values to the neural networks 13 may include only the maximum sound pressure and the excess ratio, and do not necessarily need to include state variables that represent the traveling state of the vehicle 30.

In the above-described embodiment, the neural network 13 is configured to output the passing likelihood variable and the failing likelihood variable. The passing likelihood variable indicates the likelihood that the result of the unusual-noise determination indicates that there is no unusual noise. The failing likelihood variable indicates the likelihood that the result of the unusual-noise determination indicates that there is unusual noise. The neural network 13 may be configured to output a variable that indicates other results of the unusual-noise determination.

In the above-described embodiment, the neural network 13 includes a single intermediate layer. However, the neural network 13 may be configured to include two or more intermediate layers.

In the neural network 13 of the above-described embodiment, an activation function other than a sigmoid function may be used.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An unusual-noise determination device for a vehicle that performs unusual-noise determination to determine whether a power transmission system of the vehicle is generating unusual noise, the unusual-noise determination device comprising:
   an execution device including at least one processor and/or processing circuitry; and
   a memory device, wherein:
   a maximum sound pressure is defined as a maximum value of sound pressures obtained by measuring a sound pressure of an operating noise of the power transmission system at multiple frequencies, while changing an input rotation speed of the power transmission system,
   an excess ratio is defined as a ratio of a sum of widths of frequency ranges in which the sound pressure exceeds a reference value to a width of an overall frequency range in which the sound pressure is measured,
   the memory device stores a neural network that uses the maximum sound pressure and the excess ratio as inputs, and outputs a determination result variable, the determination result variable being a variable indicating a result of the unusual-noise determination,
   the neural network is a trained neural network that has been trained using training data, the training data including:
      measured values of the maximum sound pressure and the excess ratio of each of multiple vehicles; and
      an evaluation value of the determination result variable that is set through sensory evaluation by evaluators for each of the multiple vehicles, and
   the execution device including the at least one processor and/or processing circuitry is configured to determine whether a respective operating noise of the power transmission system is unusual or not, based on an output of the trained neural network that uses, as inputs, the maximum sound pressure and the excess ratio of the respective operating noise of the power transmission system.

2. The unusual-noise determination device for a vehicle according to claim 1, wherein the inputs to the trained neural network include a state variable, the state variable representing a traveling state of the vehicle at a time when the maximum sound pressure and the excess ratio are measured.

3. The unusual-noise determination device for a vehicle according to claim 2, wherein the state variable includes at least one of a vehicle speed or an accelerator operation amount.

4. The unusual-noise determination device for a vehicle according to claim 1, wherein the maximum sound pressure and the excess ratio are calculated by using values obtained by subjecting the measured values of the sound pressures at respective frequencies to sensory characteristic correction in order to compensate for differences in an auditory sensitivity to respective frequencies of humans.

5. The unusual-noise determination device for a vehicle according to claim 1, wherein the execution device and the memory device are mounted on the vehicle.

* * * * *